Feb. 28, 1939.　　　G. F. DEADY　　　2,148,443
LIQUID-FUEL METER
Original Filed June 22, 1934
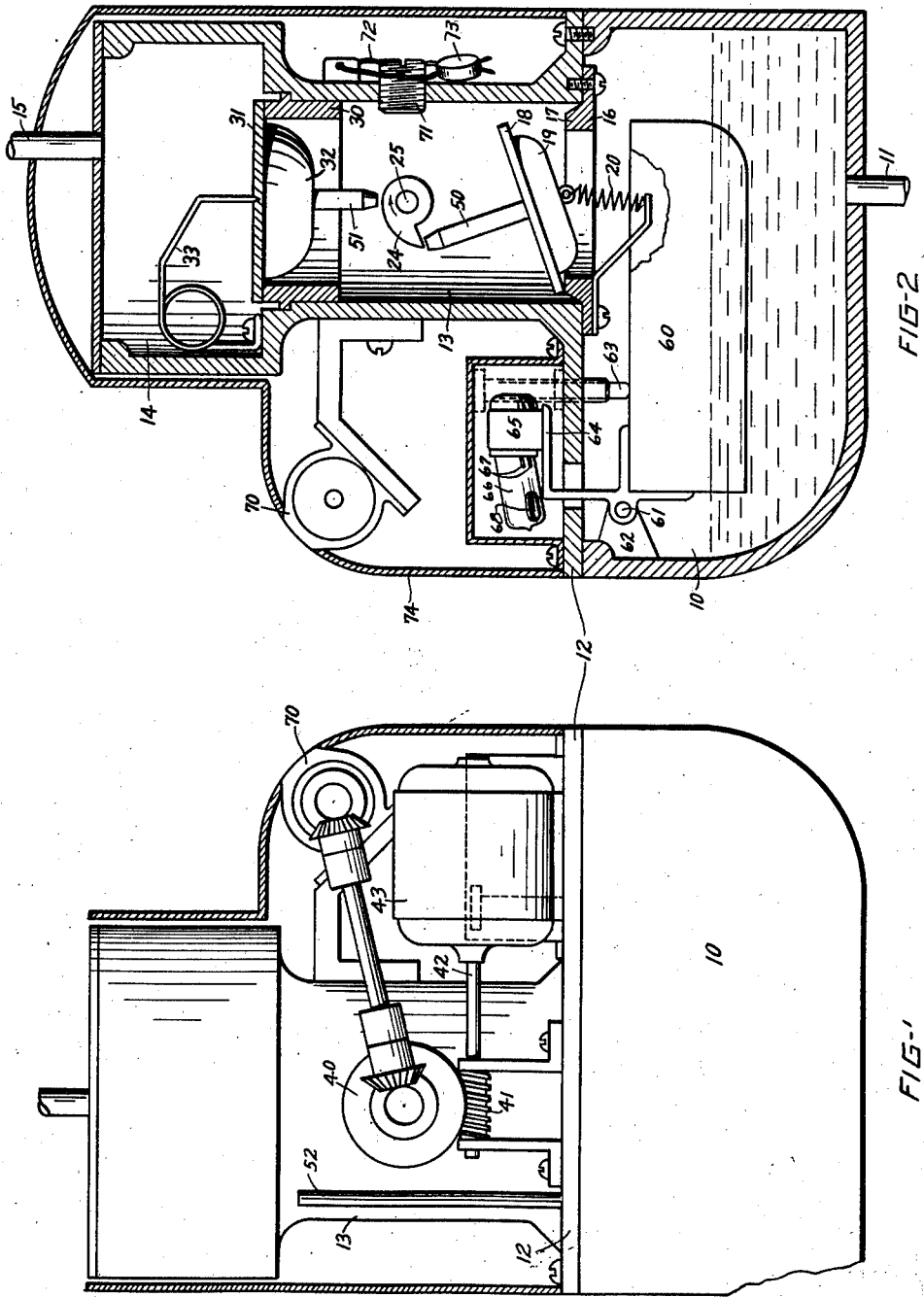
INVENTOR
George F. Deady,
BY
Fassett and Fassett,
ATTORNEYS.

Patented Feb. 28, 1939

2,148,443

UNITED STATES PATENT OFFICE 2,148,443

LIQUID-FUEL METER

George F. Deady, Dayton, Ohio, assignor to Deady Meter Corporation, Dayton, Ohio, a corporation of Ohio Application June 22, 1934, Serial No. 731,917
Renewed March 19, 1937

16 Claims. (Cl. 73—223)

This invention relates to meters for the liquid-fuel consumed by the hydro-carbon engine of a motor vehicle, and its purpose is to accurately register the amount of liquid fuel consumed by the engine of such a vehicle.

By the use of such meters on their vehicles, the owners of busses, trucks, cabs and other vehicles are enabled to check up the reports of their operators on the amount of fuel bought while on the road, thereby closing what has been found the source of considerable financial losses.

I shall now proceed to describe my invention in detail with the aid of the accompanying drawing, in which Fig. 1 is an elevational view of the left side of my meter, with a portion of the enclosing casing removed, and Fig. 2 is an elevational view of the right side of the apparatus, shown partly in section. To simplify the drawing the apparatus is to a considerable extent shown diagrammatically.

A hollow base 10 contains the measured fuel, and from this base the fuel runs by gravity through a tube 11 to the carbureter of the vehicle (not shown). This hollow base is closed with a plate 12, from which rises a measuring vessel 13, at the upper end of which is located a supply reservoir 14. Fuel is fed to this supply reservoir through the tube 15 in any suitable way. That is it may run thereto by gravity, it may be pumped thereto or carried there in any of various ways that may be employed for the purpose.

In the bottom of the measuring vessel 13 is a valve adapted when the valve is open to allow the fuel contained in the vessel to quickly run into the hollow base 10, which will hereinafter be referred to as the float chamber or lower reservoir 10. In its present embodiment this valve comprises a ring 16 secured to the under side of the plate 12 with screws. This ring has an annular valve seat 17 that extends up into the chamber 13 a short distance. The valve comprises a disc 18 adapted to lie on the seat 17, and depending from the disc 18 is a guide or centering piece 19. The surfaces of ring 17 and disc 18 are hardened and ground, making a very excellent valve. The valve is kept to its seat by a spring 20, although gravity and the weight of the liquid in the vessel may be depended upon. The guide 19 is slightly smaller in diameter than the seat 17, allowing the valve to move around a little, thus causing any sediment that may be brought in by the fuel to work its way out. Furthermore, when the valve is opened the rush of liquid through to the float chamber washes the seat clean.

The top of the measuring vessel is closed with a similar valve to that just described, wherefor a ring 30 supplies the seat. This valve comprises a disc 31, a guide 32 and is closed by a spring 33. For operating these valves, either or both of which are large dump valves, I provide a cam 24 which is mounted on a shaft 25 which passes through a stuffing box (not shown) which prevents leakage of fuel around the shaft. Mounted on the shaft 25 outside of the measuring chamber is a worm wheel 40 meshed with a worm 41 rigidly secured to the shaft 42 of a motor 43.

Extending upward from the valve 18 is a stem 50, and depending from the valve 30 is a similar stem 51. These stems reach to positions such that as the cam 24 rotates it engages the stems 50 and 51 alternately and opens the valves, each valve being closed by its spring when the point of the cam passes its stem. The action of the valves is clearly demonstrated by the position of valve 18, the stem of which has just passed the point of the cam, and it will be understood that each valve is closed before the other valve is opened. The valve 18 being large in diameter and open a considerable distance, the fuel rapidly runs out of the vessel 13, just as it would run out of an inverted bottle with a large mouth. This is facilitated by a vent tube 52, fixed in the plate 12, Fig. 1, and communicating with the interior of the hollow base 10.

The motor 43 is controlled by a float in the float chamber 10, arranged to close a switch and start the motor when the fuel in the chamber descends to a certain level, the switch turning itself off when the float rises to a certain level, a register being provided to register the number of times the measuring vessel empties into the float chamber.

A float 60 is hinged at 61 to a bracket 62 and the upward movement of the float is limited by a stop 63. An arm 64 attached to and extending upward from the float carries the switch, which switch comprises a base 65 carrying a cylindrical glass bulb 66 in one end of which is secured a pair of electrodes 67. Within this bulb is a globule 68 of mercury, adapted when the float 60 descends to a certain point to run to the end of the bulb containing the electrodes 67 and electrically connect them, thus closing the circuit, not shown, through the motor and starting the motor 43. As long as the motor continues to run, one measuring vessel 13 full of fuel after another is emptied into the float chamber 10, until the float rises high enough to cause the globule of mercury to run away from the electrodes, thereby stopping the motor.

The counter previously referred to, whereby the number of measuring vessels-full of fuel emptied into the float chamber is registered, is shown at 70, this counter being geared to the worm wheel 40. The gear ratio may be such that the counter reads in gallons of fuel, or it may be arranged to read in any other way desired, this obviously being a mere matter of design. At 71 the measuring vessel 13 is fitted with a sealing screw, as a liquid-displacement plug, whereby the capacity of the vessel may be correctly adjusted, by screwing the plug 71 in or out, so that a given number of vessels-full of fuel will make a gallon. As is usual in such cases the screw 71 may be secured with a piece of wire 72 and a seal 73, to prevent tampering.

The parts above the plate 12 are covered with a removable hood 74, secured with any suitable form of lock or a seal, (not shown) as desired.

One of the advantages of my invention as seen from the drawing, is that I am able to make my meter smaller than earlier devices of this general type because my measuring vessel 13 as compared with the hollow base 10 or float chamber has a much smaller volumetric capacity. Accordingly, my meter comprises, in combination, mechanism for alternately opening the valves in the measuring vessel a plurality of times at intermittent intervals to discharge into the lower hollow base, or float chamber, a plurality of small measured quantities of fuel before the fuel in the chamber rises to a given height. Making the meter device smaller as a result of these constructional and operating characteristics reduces its cost and weight. These are important considerations in accessories of this type.

The measuring vessel 13 may to advantage be made cylindrical in form and disposed in upright position. Its valves 18 and 31 are preferably large size valves, with port openings approaching in size the diameter of the measuring vessel itself. Measurement of small quantities of liquid makes for accuracy, and the large size dump valves provide for quick filling and emptying operations without venting the measuring vessel.

A compact form of meter construction is produced by disposing the small measuring vessel 13 between the upper larger supply reservoir 14 and the lower larger float chamber or receiving reservoir 10 for the measured fuel. The cover plate 12 over the lower reservoir may be utilized as a supporting base for the upper parts as well as the motor 43 with its drive shaft 42 and transmission operatively connected with the cam shaft 25 and the register 70 which indicates the quantity of fuel fed through the tube 11 to an engine adapted to be served by this meter. The small measuring vessel 13 only occupies a portion of the horizontally-disposed cover plate 12, and consequently adequate space is afforded on this plate to carry the motor means, its switch 66, and other parts related thereto.

The hood 74 is fitted over the upper part of the meter and encloses the plate 12 and the several parts of the mechanism mounted on the plate adjacent the measuring vessel and also encloses the measuring-vessel volume-adjustment plug 71. This hood may be secured in place by a lock or seal to prevent tampering with the adjustment plug 71, the indicating register 70, or any other parts which make for the security and accuracy of the fuel consumed by the motor vehicle.

The accompanying drawing shows an example of my invention, and it will be understood that changes in construction and operation may be made without departing from the purposes and principles of the invention.

What is claimed is:

1. A liquid-fuel meter, comprising a measuring vessel having a comparatively large valve in its top and in its bottom to insure ingress and egress of fuel without requiring a special vent in said vessel, means for alternately operating said valves a plurality of times at intermittent intervals, closing each valve before opening the other, said means comprising a float chamber into which the measuring vessel empties when said lower valve is opened, a float in said chamber, a motor, means for starting the motor when the float descends to a given level, and means for stopping the motor when the float rises to a given level, the motor operating continuously between the times of starting and stopping, and a register operated by said operating means for indicating the number of cycles said valves operate.

2. A liquid-fuel meter, comprising a measuring vessel having a comparatively large valve in its top and in its bottom to insure ingress and egress of fuel without requiring a special vent in said vessel, means for alternately operating said valves a plurality of times at intermittent intervals, closing each valve before opening the other, said means comprising a float chamber into which the measuring vessel empties when said lower valve is opened, a float in said chamber, a motor, means for starting the motor when the float descends to a given level, and means for stopping the motor when the float rises to a given level, the motor operating continuously between the times of starting and stopping, a supply chamber from which the measuring chamber is refilled when the upper valve is open, and a register operated by said operating means for indicating the number of cycles said valves operate.

3. A liquid-fuel meter, comprising a measuring vessel having a valve in its bottom and a valve in its top, each valve comprising an annular seat and a valve-member to rest thereon, each valve having an operating stem, a cam adapted to engage said stems and open the valves alternately, each valve closing before the other opens, a float chamber to which said measuring vessel discharges, a motor whereby said cam is operated to establish communication between said measuring vessel and the float chamber, a float mechanism for regulating said motor, comprising means for starting the motor when the float descends below a given height in the float chamber and means for stopping the motor when the float rises to a given height in said chamber.

4. A liquid-fuel meter comprising a measuring vessel having a valve located in the top and bottom thereof, each valve having an operating stem, a cam adapted to engage said stems and open the valves alternately, a float chamber and a float therein, motor means for operating the cam whereby communication is established between said measuring vessel and the float chamber for receiving fuel therefrom, in combination with a float actuated mechanism for starting and stopping said motor means, said mechanism comprising means for starting the motor when the float descends to a given height in the float chamber and means for stopping the motor when the float rises to a given height in said chamber.

5. A liquid fuel meter, comprising a comparatively small measuring vessel having a valve in its bottom, and a valve in its top, a comparatively large float chamber to receive fuel from the measuring vessel, and mechanism for alternately opening each valve in said measuring vessel a plurality of times to discharge into said chamber a plurality of measured quantities of fuel before the fuel in said chamber rises to a given height, said mechanism comprising a float in said chamber, means for starting the mechanism when the float descends below a given height in the float chamber, and means for stopping the mechanism when the float rises to a given height in said chamber.

6. A liquid fuel meter comprising a measuring vessel having a valve in its top and a second valve in its bottom, a chamber having a float into which said measuring vessel discharges, valve operating means controlled by the float in the float chamber, for opening and closing said valves alternately, one valve being closed before the other is opened, the valve operating means operating continuously between the times of starting and stopping to open and close said valves a plurality of times to fill and discharge the measuring vessel a plurality of times for each operation period, and a register, operated by the valve operating means, for registering the number of cycles said valves perform.

7. A liquid-fuel meter for motor vehicles comprising, in combination, a housing enclosing an upper supply reservoir adapted to be connected with and maintained full of fuel from the fuel tank of such vehicle, as well as a lower reservoir for receiving a measured amount of fuel and adapted to be connected with the carburetor of the vehicle engine, a measuring vessel located between the two reservoirs and less in capacity than said reservoirs, a normally-closed inlet valve mounted in the top of the measuring vessel for admitting fuel from the supply reservoir into said measuring vessel and completely filling the latter, a normally-closed outlet valve in the bottom of the measuring vessel for completely discharging the measured fuel therefrom into the lower reservoir; motor means mounted within the housing and operatively connected with both valves for first opening and closing the inlet valve and thereby filling the measuring vessel, and then opening the outlet valve and discharging the measured fuel into the lower reservoir; a register mounted in the housing and operatively connected with and driven by the motor means for indicating the number of measuring-vessels full of fuel discharged into the lower reservoir, a switch mounted within the housing to control the operation of the motor means, and means responsive to the rise and fall of the fuel level in the lower reservoir to open and close the switch.

8. A liquid-fuel meter for motor vehicles comprising, in combination, a housing enclosing an upper supply reservoir adapted to be connected with and maintained full of fuel from the fuel tank of such vehicle, as well as a lower reservoir for receiving a measured amount of fuel and adapted to be connected with the carburetor of the vehicle engine, a small size measuring vessel located between the two reservoirs, a normally-closed inlet dump valve mounted in the top of the measuring vessel for admitting fuel from the supply reservoir into said measuring vessel, a normally-closed outlet dump valve in the bottom of the measuring vessel for completely discharging the measured fuel therefrom into the lower reservoir, both dump valves aforesaid having a large port area and size about equal to the size of the measuring vessel; motor means mounted within the housing and operatively connected with both dump valves for first opening and closing the inlet dump valve and thereby filling the measuring vessel, and then opening the outlet dump valve and discharging the measured fuel into the lower reservoir; a register mounted in the housing and operatively connected with and driven by the motor means for indicating the number of measuring-vessels full of fuel discharged into the lower reservoir, a switch mounted within the housing to control the operation of the motor means, and means responsive to the rise and fall of the fuel level in the lower reservoir to open and close the switch.

9. A liquid-fuel meter for motor vehicles comprising, in combination, a housing enclosing an upper supply reservoir adapted to be connected with the fuel tank of such vehicle, a lower reservoir for receiving a measured amount of fuel, an upright measuring vessel located between the two reservoirs and less in capacity than said reservoirs, said measuring vessel being formed open at the top and bottom with large ports substantially equal in diameter to the diameter of the measuring vessel, a normally-closed inlet dump valve mounted in the upper port, a normally-closed outlet dump valve mounted in the lower port; motor means mounted within the housing, a single operating connection from the motor to both dump valves for first opening and closing the inlet dump valve and thereby filling the measuring vessel, and then opening the outlet dump valve and discharging the measured fuel into the lower reservoir; a register operatively connected with and driven by the motor means for indicating the number of measuring-vessels full of fuel discharged into the lower reservoir, and means to start the motor means when the supply of measured fuel runs low in the lower reservoir and to stop the motor means when the supply therein is replenished.

10. A liquid-fuel meter for motor vehicles comprising, in combination, an upper large-size supply reservoir, a small-size measuring vessel depending from the supply reservoir and opening thereinto, a lower large-size reservoir under the measuring vessel and opening into the latter to receive measured fuel therefrom, a cover plate over the lower reservoir which supports the measuring vessel and the upper reservoir and which plate projects horizontally from said measuring vessel, a hood disposed over the upper reservoir and the measuring vessel and having its lower edge fitted to the cover plate thereby enclosing a space adjacent said measuring vessel, a dump valve in the upper end of the measuring vessel, a dump valve in the lower end of the measuring vessel, a motor means mounted on the cover plate within the space adjacent the measuring vessel and enclosed by the hood, a register mounted within the hood and visible through an opening therein, a drive transmission enclosed within the hood and operatively connecting the motor with the register to actuate it and with both valves to actuate them, and means to start the motor when the fuel supply in the lower reservoir runs low and to stop the motor when the fuel supply is replenished therein.

11. A liquid-fuel meter for motor vehicles comprising, in combination, an upper large-size supply reservoir, a small-size measuring vessel depending from the supply reservoir and opening thereinto, a lower large-size reservoir disposed under the measuring vessel and opening into the latter to receive measured fuel therefrom and projecting horizontally from the lower end of said measuring vessel, a cover plate over the lower reservoir and which plate also projects horizontally from said measuring vessel, a removable hood disposed about the measuring vessel and being fitted to the lower reservoir thereby enclosing said measuring vessel and adapted to protect all operating parts of the meter, a dump valve in the upper end of the measuring vessel, a dump valve in the lower end of the measuring vessel, a motor means enclosed by the hood, a register mounted within the hood and visible through an opening therein, a drive transmission enclosed within the hood and operatively connecting the motor with the register to actuate it and with both valves to actuate them, and means to start the motor when the fuel supply in the lower reservoir runs low and to stop the motor when the fuel supply is replenished therein.

12. A liquid-fuel meter for motor vehicles comprising, in combination, an upper large-size supply reservoir, a small-size measuring vessel depending from the supply reservoir and opening thereinto, a liquid-displacement plug screw threaded into the measuring vessel and adapted to be screwed in or out to finally adjust the volumetric capacity of said measuring vessel, a lower large-size reservoir under the measuring vessel and opening into the latter to receive the measured fuel therefrom, a cover plate over the lower reservoir, a hood disposed over the meter enclosing the measuring vessel and the liquid-displacement plug; a dump valve in the upper end of the measuring vessel, and a dump valve in the lower end of the measuring vessel, both of which are large-size valves to provide for quick filling and emptying operations without venting the small measuring vessel to atmosphere; a motor means mounted on the cover plate adjacent the measuring vessel and enclosed by the hood, a register mounted within the hood and visible through an opening therein, a drive transmission enclosed within the hood and operatively connecting the motor with the register and with both valves, and control means to start the motor when the measured fuel supply in the lower reservoir runs low and to stop the motor when the fuel supply is replenished therein.

13. A liquid-fuel meter comprising, in combination, a reservoir adapted to receive fuel from the supply tank of a motor vehicle, a small measuring vessel depending from the reservoir and having a port opening thereinto, a second reservoir having a port opening into the lower end of the measuring vessel and adapted to supply measured fuel to the carburetor of the motor vehicle, a dump valve seated in each port, means to operatively hold each dump valve normally closed, a stem carried on each dump valve and projecting toward the central part of the measuring vessel, dump valve operating means comprising a single moving part mounted within the measuring vessel and engaging both valve stems, an indicating register to count the valve operations, and means for actuating the valve operating means and the register a plurality of times to supply a plurality of measured quantities of fuel to said second reservoir.

14. A liquid-fuel meter comprising, in combination, a reservoir adapted to receive fuel from the supply tank of a motor vehicle, a measuring vessel depending from the reservoir and having a large port opening thereinto, a second reservoir having a large port opening into the lower end of the measuring vessel and adapted to supply measured fuel to the carburetor of the motor vehicle, a dump valve seated in each port, a spring mounted within each reservoir and operatively connected with each dump valve to hold same normally closed, a stem carried on each dump valve and projecting toward the central part of the measuring vessel, a valve operating means comprising a single rotating member mounted within the measuring vessel and alternately engaging each valve stem, an indicating register to count the valve operations, and means to drive the valve operating means and the register for a period of time to effect a plurality of valve dumping operations until said second reservoir becomes filled with measured fuel.

15. A liquid-fuel meter comprising, in combination, a reservoir adapted to receive fuel from the supply tank of a motor vehicle, a small measuring vessel depending from the reservoir and having a port opening thereinto, a reservoir having a port opening into the lower end of the measuring vessel and adapted to supply measured fuel to the carburetor of the motor vehicle, said ports being large in area and approaching in size the diameter of the measuring vessel, a normally-closed dump valve seated in each large port, said valves being formed of large size disks seated over the large ports, a stem carried on the inside of each valve disk and projecting toward each other within the measuring vessel, a valve operating cam disposed within the measuring vessel and engaging both valve stems to alternately open and close the valves, an indicating register to count the valve operations, and means to drive the valve operating means and the register.

16. A liquid-fuel meter comprising, in combination, a reservoir adapted to receive fuel from the supply tank of a motor vehicle, a measuring vessel depending from the reservoir and having a port opening thereinto, a reservoir having a port opening into the lower end of the measuring vessel and adapted to supply measured fuel to the carburetor of the motor vehicle, a valve operatively seated in each port to normally close both ends of the measuring vessel, a shaft journalled in the wall of the measuring vessel between the valves, a cam carried on the shaft within the measuring vessel and having a single operating lobe, a stem carried by and projecting from each valve to the cam and operatively engaging said cam, driving means to rotate the cam whereby its lobe alternately actuates each valve stem, and an indicating register operatively connected with the drive means to count the valve operations.

GEORGE F. DEADY.